United States Patent [19]

Tanaka

[11] Patent Number: 5,214,511
[45] Date of Patent: May 25, 1993

[54] IMAGE TRANSFORMING APPARATUS
[75] Inventor: Sadaaki Tanaka, Kanagawa, Japan
[73] Assignee: Sony Corporation, Tokyo, Japan
[21] Appl. No.: 798,156
[22] Filed: Nov. 26, 1991
[30] Foreign Application Priority Data
Nov. 30, 1990 [JP] Japan .................. 2-339770
Nov. 30, 1990 [JP] Japan .................. 2-339771
Nov. 30, 1990 [JP] Japan .................. 2-339772
[51] Int. Cl.5 .......................... H04N 5/262
[52] U.S. Cl. ............... 358/183; 358/22; 382/44; 382/41
[58] Field of Search .......... 358/183, 181, 22, 160, 358/182; 364/521, 518, 522; 382/41, 44, 45, 50; 340/729, 723

[56] References Cited
U.S. PATENT DOCUMENTS
4,551,752 11/1985 Wall et al. ........................ 358/160
4,646,154 2/1987 Shinohara et al. ............... 358/22
4,860,217 8/1989 Sasaki et al. ..................... 382/44
4,953,107 8/1990 Hedley et al. .
4,965,844 10/1990 Oka et al. ......................... 358/22

FOREIGN PATENT DOCUMENTS
0194066 10/1986 European Pat. Off. .
0211345 2/1987 European Pat. Off. .
0398810 11/1990 European Pat. Off. .
0442825 8/1991 European Pat. Off. .
2231471 11/1990 United Kingdom .

Primary Examiner—James J. Groody
Assistant Examiner—Michael H. Lee
Attorney, Agent, or Firm—William S. Frommer; Alvin Sinderbrand

[57] ABSTRACT

An image transforming apparatus forms an output image by mapping input image onto a three-dimensional curved surface, and obtains a position of a region on an input image corresponding to a position on the output image where image information becomes discontinuous. After a blanking signal is inserted into this region of the input image, an output image signal is formed by interpolating process on the basis of an input image signal with the blanking signal inserted.

7 Claims, 10 Drawing Sheets

IMAGE TRANSFORMING APPARATUS

BACKGROUND OF THE INVENTION

This invention relates to an image transforming apparatus which changes an input image to form an output image, and more particularly to an image transforming apparatus wherein the output image is formed by mapping the input image onto a three-dimensional curved surface.

This type of a special effect device is known, for example, as disclosed in U.S. Pat. No. 4965844. In the special effect device a TV signal is converted into a digital signal, and an image appearing as if an input image is stuck to a three-dimensional surface (e.g., a cylindrical surface) is displayed on a display.

This type of image transforming method involves the steps of dividing the input image into blocks having predetermined sizes, sequentially storing image data of each block in a predetermined intra-memory address on the basis of a write address, executing a predetermined arithmetic operation with respect to the stored address of the input image data before being transformed on the basis of transform input data inputted by an operator through a separate input means, reading the block image data stored in the predetermined intra-memory address in accordance with a read address obtained as a result of the foregoing arithmetic operation when assembling the output image by a raster scan so that the output image appears as if the input image is stuck to a predetermined three-dimensional surface, and obtaining the output image consisting of such a two-dimensional plane that the input image is apparently transformed into a three-dimensional surface.

The read address value obtained as a result of the arithmetic operation is, because it directly represents the arithmetic result, not an address value predetermined in the memory but an address value having a fraction in some cases.

Hence, in this case, an interpolating means multiplies, respectively by predetermined coefficients, the image data of addresses in front of and in rear of the intra-memory address corresponding to the read address value having the fraction. Thereafter, those values are added to obtain the image data corresponding to the read address obtained as a consequence of the arithmetic operation.

However, for instance, an input image VDIN shown in FIG. 1A is wound on a cylindrical surface IM illustrated in FIG. 1B. In this case, folded segments TN of the input image VDIN are produced on the cylindrical surface IM. The image is folded back at the folded segments TN, resulting in such a state that the image on the display image is discontinuous. Therefore, in the folded segments TN, the addresses allocated to the respective blocks of the input image VDIN become discontinuous on an output image VDOUT1, with the result that the above-mentioned interpolation can not be done.

As a result of this, the fraction of the arithmetically obtained address value is omitted. The point at issue arise, wherein, as in the quality in FIG. 1B, the image for an output image does not assume a smooth line (or curve) at the folded segments TN; and instead, conspicuous stepped notches are formed therein, resulting in a deterioration of the output image.

Also, as the same reason, the point at issue arise, shown in FIG. 1C, stepped notches G1 are formed at the edge portion of cylindrical surface IM, resulting in a decline of the output image.

SUMMARY OF THE INVENTION

In view of the foregoing, an object of this invention is to provide an image transforming apparatus in which it is possible to retain the quality of edge portions of the output image formed by mapping the input image onto a three-dimensional curved surface.

The foregoing object and other objects of the invention have been achieved by the provision of an image transforming apparatus which comprises, blanking addition means for inserting a blanking signal in a predetermined area of the input image, storing means for storing the input image with the inserted blanking signal, interpolation means for forming the output image by an interpolating process, arithmetic operation means for executing arithmetic operation by which data representative of a region of the input image is produced corresponding to a position on the output image at which image information becomes discontinuous, and control means for controlling the blanking means on the basis of the data obtained by the arithmetic operation means.

DETAILED DESCRIPTION OF THE INVENTION

Figure 1A:
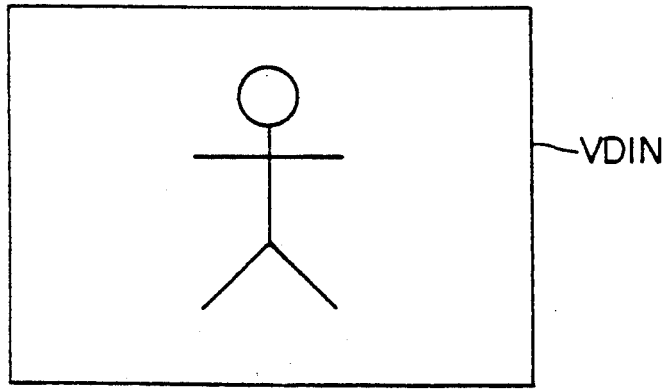
FIG. 1A to 1C are schematic views explaining an image transformation in the prior art.
Figure 1B:
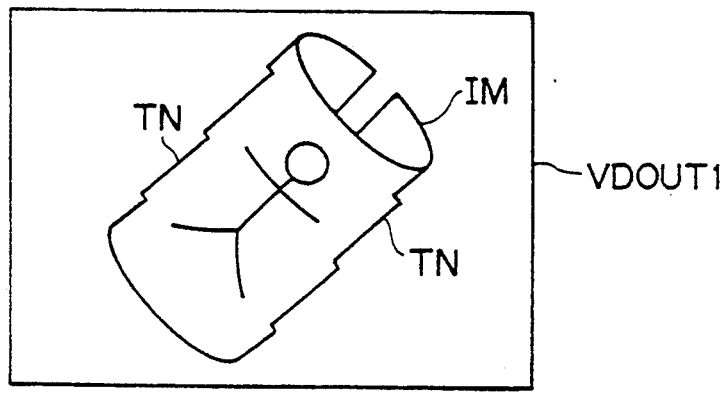
Figure 1C:
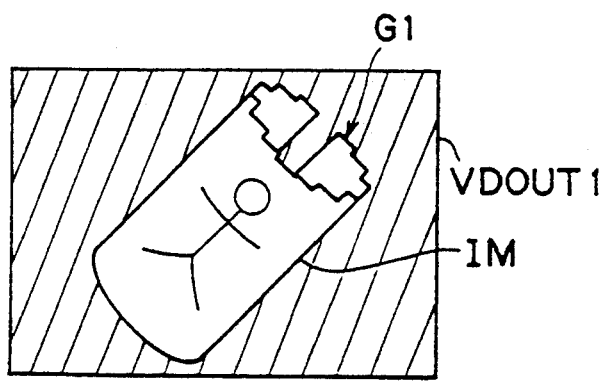
Figure 2:
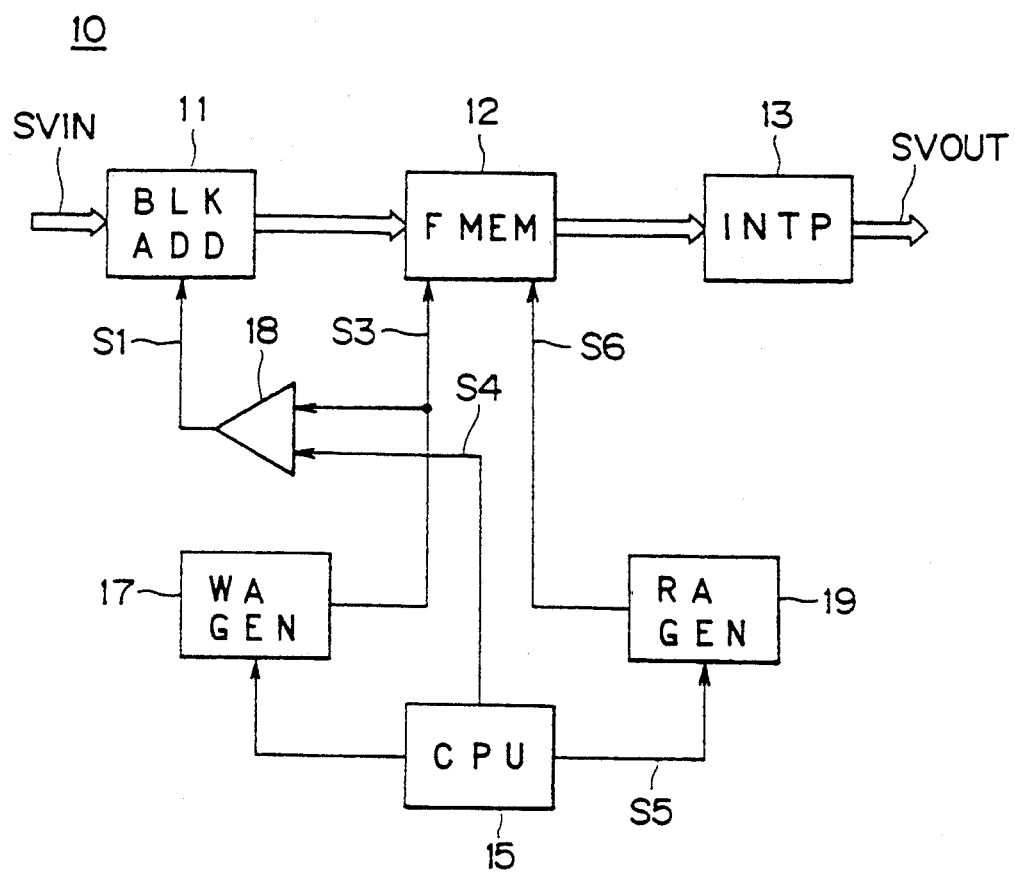
FIG. 2 is a block diagram illustrating one embodiment of an image transforming apparatus according to the present invention.

Preferred embodiments of this invention will be described with reference to the accompanying drawings:

Referring to FIG. 2, the numeral 10 generally designates an image transforming device for transmitting an input video signal SVIN to a frame memory 12 via a blanking area (BLK) add circuit 11.

Based on a write address signal S3 transmitted from a write address generating circuit 17, the frame memory 12 specifies addresses within the frame memory 12 itself with respect to blocks obtained by dividing one-frame image data of an input image VDIN according to a predetermined size, the image VDIN being inputted in response to the input video signal SVIN. The frame memory 12 then sequentially stores the image data of respective blocks in accordance with the thus allocated addresses.

Figure 3A:
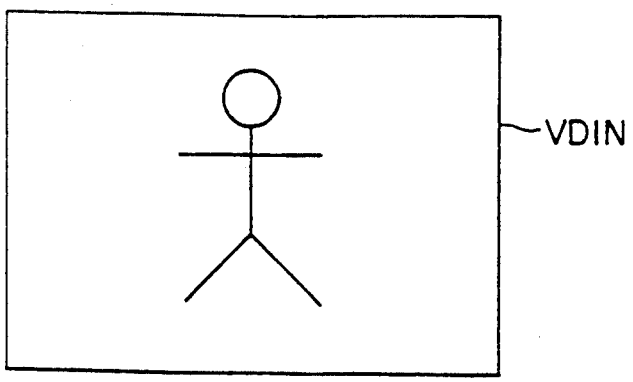
FIGS. 3A to 3C are schematic views explaining an image transforming method according to the present invention.

At this time, a CPU (Central Processing Unit) 15 reads the image data of the respective blocks of the input image VDIN stored in the frame memory 12 in response to a read address signal S6 transmitted from a read address generating circuit 19. The image is thereby transformed into an output image VDOUT2 in which the respective blocks of the input image VDIN depicted in FIG. 3A are sequentially stuck to polygonal pseudo surface elements on a predetermined three-dimensional surface (e.g., cylindrical surface) IM as shown in FIG. 3C. Here, the sticking or adhering of the input image to the three-dimensional surface is referred to as mapping.

In the cylindrical surface IM of the output image VDOUT2, the image information becomes discontinuous because of discontinuously reading the continuous blocks of the input image VDIN at folded segments TN. An interpolating process is not executable at these segments.

Therefore, the CPU 15 executes a process to form a black level blanking area BLK beforehand on the input image VDIN defined as an original image of the output image VDOUT2 with respect to the folded segments TN in which the image information goes discontinuous as the output image VDOUT2 as shown in FIG. B3.

Namely, in consequence of arithmetic processing, the CPU 15 previously transmits to a comparing circuit 18 the address, as an address discontinuous position specifying signal S4, of the frame memory 12 for storing the image data corresponding to the address discontinuous segments (TN) on the output image VDOUT2.

The comparing circuit 18 inputs the write address signal S3 inputted from the CPU 15 via the write address generating circuit 17. When the write address specified by the write address signal S3 coincides with an address specified beforehand by the address discontinuous position specifying signal S4, the blanking add signal S1 is transmitted to the BLK add circuit 11. Predetermined areas containing the discontinuous specifying segments of the input video signal SVIN are thereby changed to assume the black level.

Figure 3B:
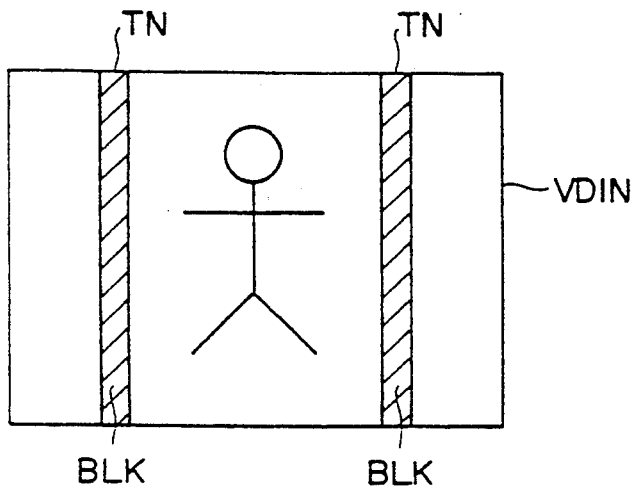
Figure 3C:
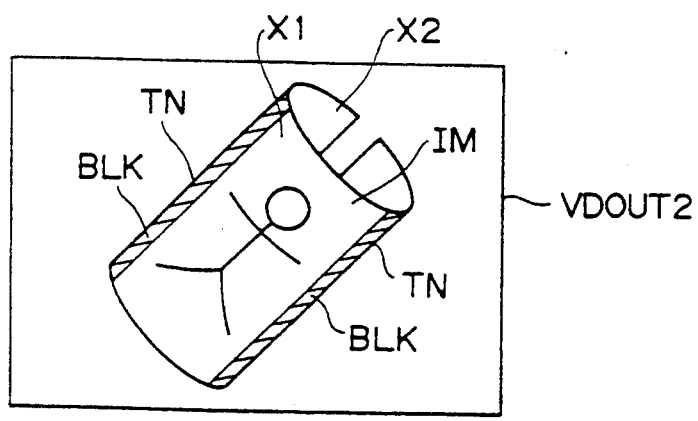

In consequence of this, as illustrated in FIG. 3B, the black level blanking areas BLK are previously formed in the areas serving as the folded segments TN as the output image VDOUT2. In this state, the input image VDIN is stored in the frame memory 12.

Hence, the input video signal SVIN changed to assume the black level at the discontinuous specifying segments is stored in the address areas allocated to the discontinuous segments (TN) as the output image by the write address signal S3 in the frame memory 12.

Contrastingly, in the case of outputting the output image obtained by giving the special effect to the input image, the CPU 15 calculates a read address by performing a predetermined arithmetic operation based on transform data inputted separately by the input unit. The read address is sent as the read address signal S6 to the frame memory 12 via the read address generating circuit 19. The image data in the address specified by the read address is thereby read from each address area in the frame memory 12 in which the input video signal VDIN is stored.

As a result of this, the change-to-black-level blanking areas BLK which have been changed to assume the black level and stored previously therein are allocated to the address discontinuous segments (folded segments TN) of the output image VDOUT2.

Hence, in the address discontinuous segments (TN), it follows that there exist the black level blanking area BLK continuous to a first image area X1 (FIG. 3c) to be actually displayed and the black level blanking area BLK continuous to a second image area X2 a part of which is folded back and concealed. When executing an interpolating process in a subsequent interpolation circuit 13, the smooth interpolation can be effected between the first image region X1 and the blanking area BLK and between the second image areas X2 and the blanking area BLK.

Contrastingly, the black level blanking areas BLK are discontinuous at the folded segments TN and therefore it is difficult to perform the interpolating process thereon. However, even if stepped notches are formed at those segments, these notches are prevented from appearing on the display image because of being configured all by the black level as the image information.

In the folded areas TN, the image is displayed while being compressed, thereby making the blanking areas BLK inconspicuous.

Therefore, it is feasible to obtain the output image VDOUT2 with no conspicuous stepped notches produced as in the prior art.

Based on the construction given above, when the address discontinuous segments (TN) are produced on the output image VDOUT2, the black level blanking areas are formed beforehand in the discontinuous specifying areas on the input image VDIN to be transformed into the discontinuous segments. The discontinuous segments (TN) can be thereby formed in the blanking areas. It is therefore feasible to make the conspicuous stepped notches invisible.

Figure 4:
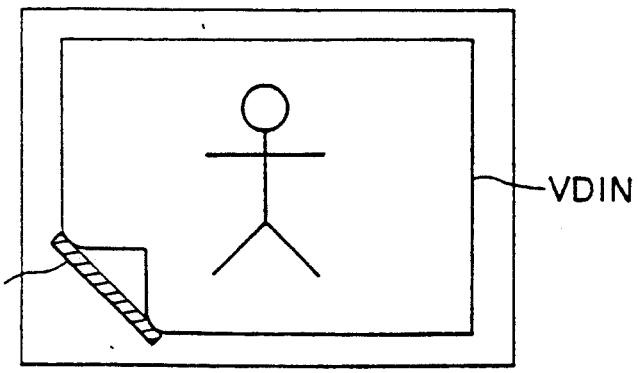
FIG. 4 is a schematic view to which reference will be made in explaining another embodiment of the invention.

Described in the embodiment discussed above is the case where the input image is transformed into the cylindrical surface IM. However, the present invention is not limited to this arrangement. For example, as illustrated in FIG. 4, even in the case of effecting a transformation corresponding to turning of a page with respect to the input image VDIN, the blanking areas are formed in the read address discontinuous segments. With this arrangement, no conspicuous stepped notches are produced. In short, this invention is applicable widely to image transformation that cause the read address to become discontinuous.

Further, in the embodiment discussed above, the blanking areas BLK are constituted by a video signal at the black level. The present invention is not, however, limited to this arrangement. The blanking areas assuming a variety of colors can be formed corresponding to the input image VDIN.

Mentioned further in the embodiment discussed above is the case where the blanking area BLK is formed with respect to the input image. The present invention is not, however, limited to this arrangement. For instance, it is feasible to effectively restrain the notches of the image keyed by a keying signal by effecting the same process as the above-mentioned on the keying signal.

As discussed above, according to the present invention, there can be attained the image transforming device capable of preventing the conspicuous stepped notches from being produced on the display image in the discontinuous areas in the output image by previously forming the blanking areas in the address discontinuous areas on the input image with respect to the address discontinuous areas in the output image.

Figure 5:
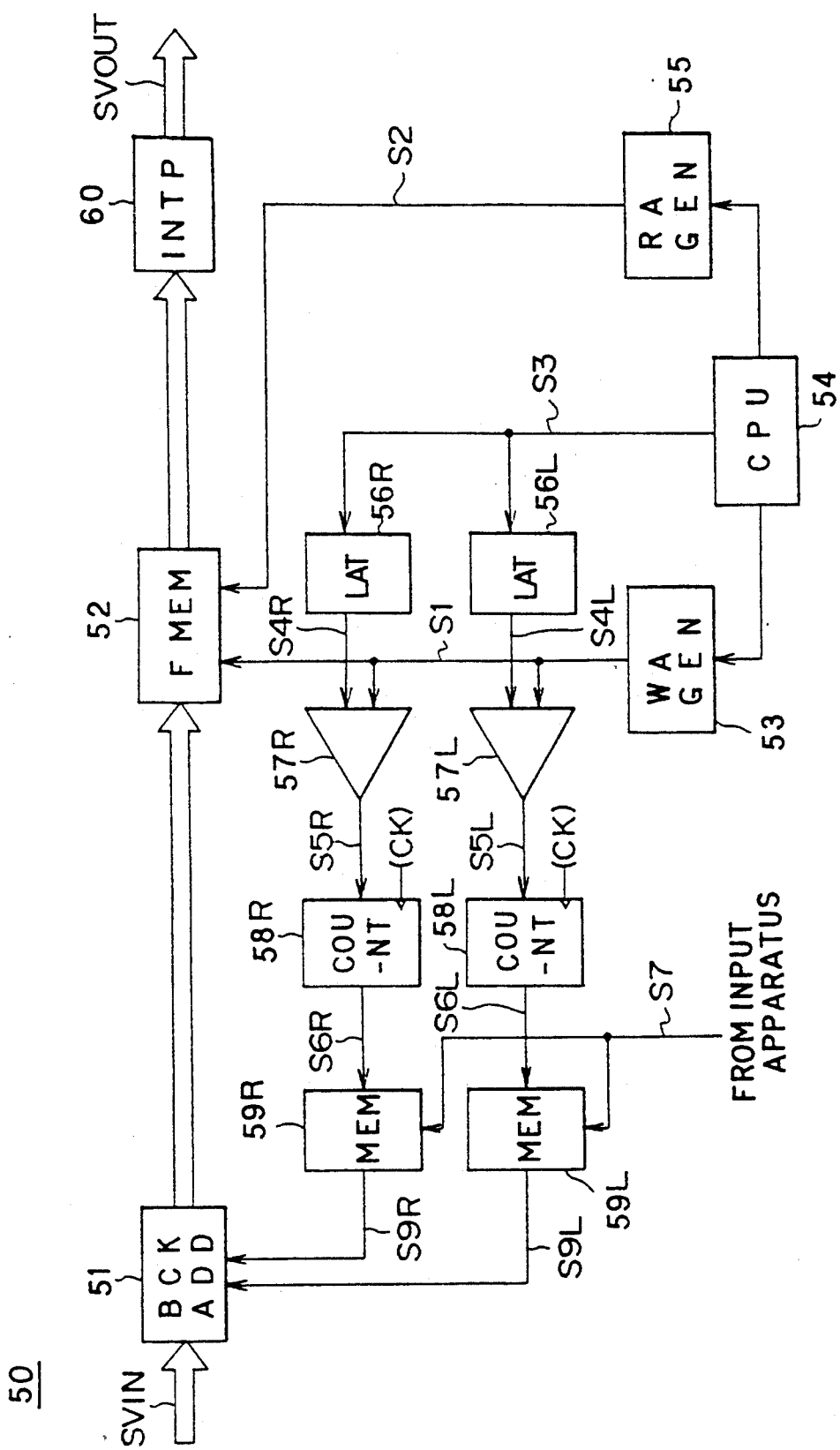
FIG. 5 is a block diagram illustrating a second embodiment of an image transforming apparatus according to the present invention.

Another embodiment of the present invention will hereinafter be described in detail with reference to FIG. 5 in which the numeral 50 generally designates an image transforming device for transmitting an input video signal SVIN to a frame memory 52 via a blanking area (BLK) add circuit 51.

Based on a write address signal S1 transmitted from a write address generating circuit 53, addresses within the frame memory 52 are specified with respect to blocks obtained by dividing one-frame image data of an input image VDIN according to a predetermined size, the image VDIN being inputted in response to the input video signal SVIN. The frame memory 52 then sequentially stores the image data of respective blocks in accordance with the thus allocated addresses.

Figure 6A:
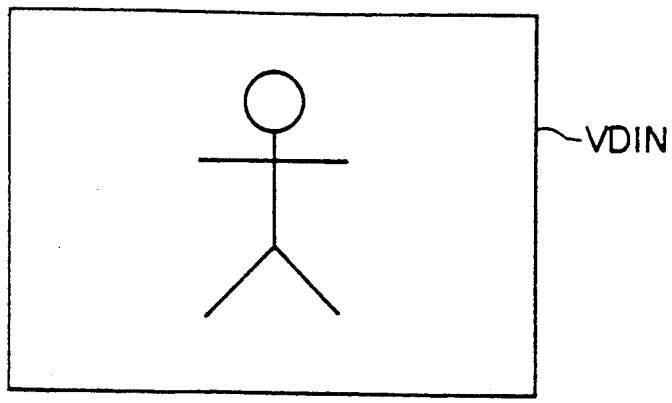
FIGS. 6A to 6C are schematic views to which reference will be made in explaining the present invention.

At this time, a CPU (Central Processing Unit) 54 reads the image data of the respective blocks of the input image VDIN stored in the frame memory 52 in response to a read address signal S2 transmitted from a read address generating circuit 55. The image is thereby transformed into an output image VDOUT2 (FIG. 6C) in which the respective blocks of the input image VDIN depicted in FIG. 6A are sequentially stuck to a polygonal pseudo surface on a predetermined three-dimensional surface (e.g., cylindrical surface) IM.

In the cylindrical surface IM of the output image VDOUT2, the image information becomes discontinuous because of discontinuously reading the continuous blocks of the input image VDIN at folded segments TNR, TNL. An interpolating process is not readily executed at these folded segments.

Therefore, the CPU 54 executes a process to form a black level blanking areas BLKL, BLKR beforehand on the input image VDIN defined as an original image of the output image VDOUT with respect to the folded segments TNR, TNL in which the image information would be discontinuous in the output image VDOUT2.

Namely, in consequence of arithmetic processing, the CPU 54 previously transmits to latch circuits 56R, 56L the address, as an address discontinuous position specifying signal S3, of the frame memory 52 for storing the image data corresponding to the address discontinuous segments (TNR, TNL) in the output image VDOUT2. Transmitted from the latch circuit 56R to a comparing circuit 57R is a picture right end address discontinuous position specifying signal S4R for specifying an address discontinuous position TNR at the right end of a picture. Transmitted also from the latch circuit 56L to a comparing circuit 57L is a picture left end address discontinuous position specifying signal S4L for specifying an address discontinuous position TNL at the left end of the picture.

The comparing circuit 57R also receives the write address signal S1 inputted from the CPU 54 via the write address generating circuit 53. When the write address specified by the write address signal S1 coincides with an address specified beforehand by the picture right end address discontinuous position specifying signal S4R, a picture right end blanking add signal S5R is transmitted to a counter circuit 58R. This counter circuit 58R is thereby actuated to transmit a counter output signal S6R to a subsequent memory circuit 59R.

During an input of a counter output signal S6R, the memory circuit 59R composed of a ROM (read only memory) transmits to the blanking add circuit 51 a blanking add signal S9R having a width W of a black level corresponding to the information on a radius a·R of the three-dimensional cylindrical surface IM and a display tilt angle $\theta$ which are inputted from a separately provided input unit.

Therefore, in the blanking add circuit 51, the black level blanking area is previously formed in the input image VDIN with respect to the right segment TNR of the folded segments where the image information becomes discontinuous when being transformed into the output image VDOUT2.

Similarly, the comparing circuit 57L receives the write address signal S1 inputted from the CPU 54 via the write address generating circuit 53. When the write address specified by the write address signal S1 coincides with an address specified by a picture left end address discontinuous position specifying signal S4L, a picture left end blanking add signal S5L is transmitted to a counter circuit 58L. The counter circuit 58L is thereby actuated to transmit a counter output signal S6L to a subsequent memory circuit 59L.

The ROM-based (read only memory) memory circuit 59L, during an input of the counter output signal S6L, transmits to the blanking add circuit 51 a blanking add signal S9L having the width W of the black level determined by information indicating the radius a·R of the three-dimensional cylindrical surface IM and the display tilt angle $\theta$ which are inputted from the separately provided input unit.

Therefore, in the blanking add circuit 51, the black level blanking area is formed in the input image VDIN beforehand with respect to the left segment TNL of the folded segments where the image information becomes discontinuous when being transformed into the output image VDOUT2.

Figure 6B:
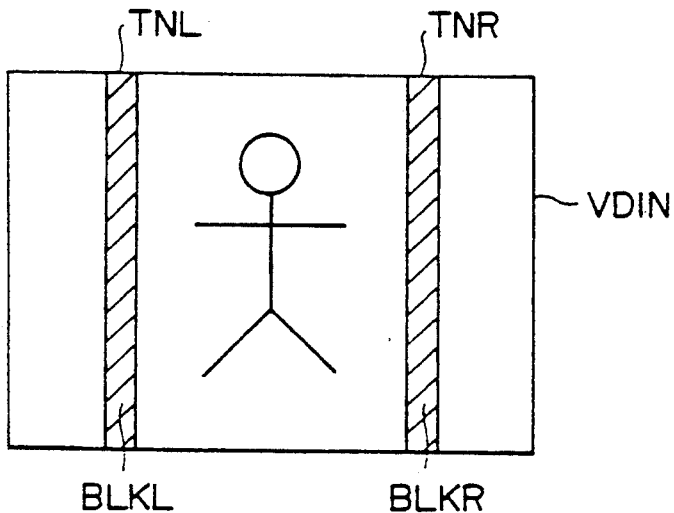
Figure 6C:
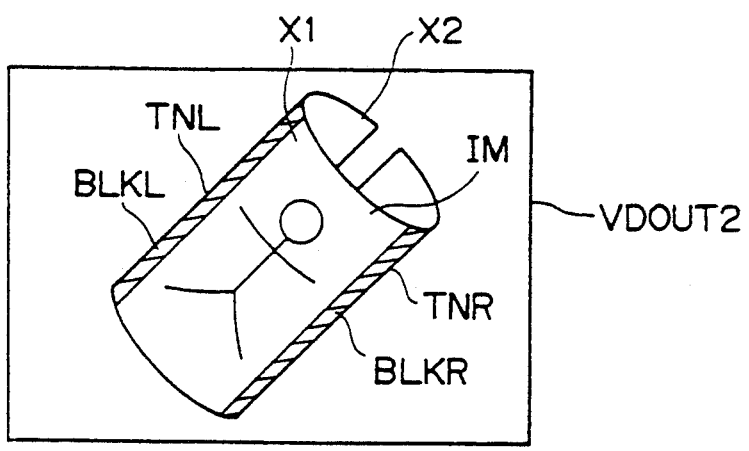

In consequence of this, as illustrated in FIG. 6B, the input image VDIN is stored in the frame memory 52 in a state where black level blanking areas BLKR, BLKL are formed beforehand in the areas TNR, TNL, i.e., areas corresponding to the folded segments of the output image VDOUT2.

Figures 7, 9:
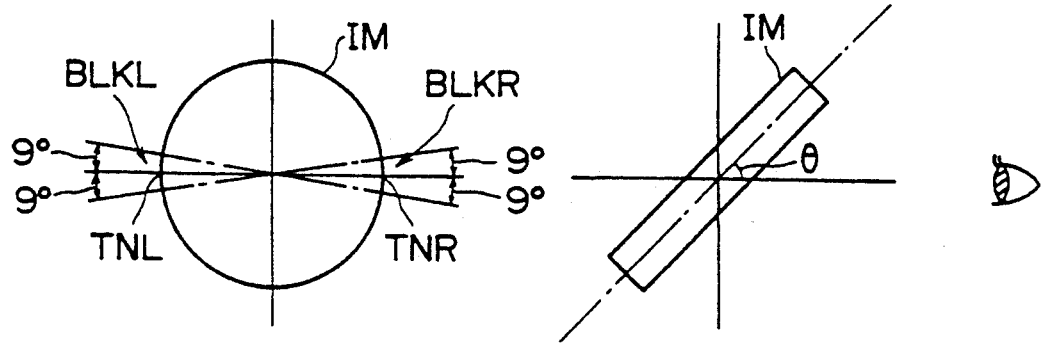
FIG. 7 is a schematic view illustrating set angles of blanking areas.
FIG. 9 is a schematic view illustrating a display tilt angle of the cylindrical surface on an output image.

In the case of this embodiment, as depicted in FIG. 7, the blanking areas are respectively formed at angles of ±9° to each side of the folded areas TNR, TNL of the three-dimensional cylindrical surface IM.

Figures 8A, 8B:
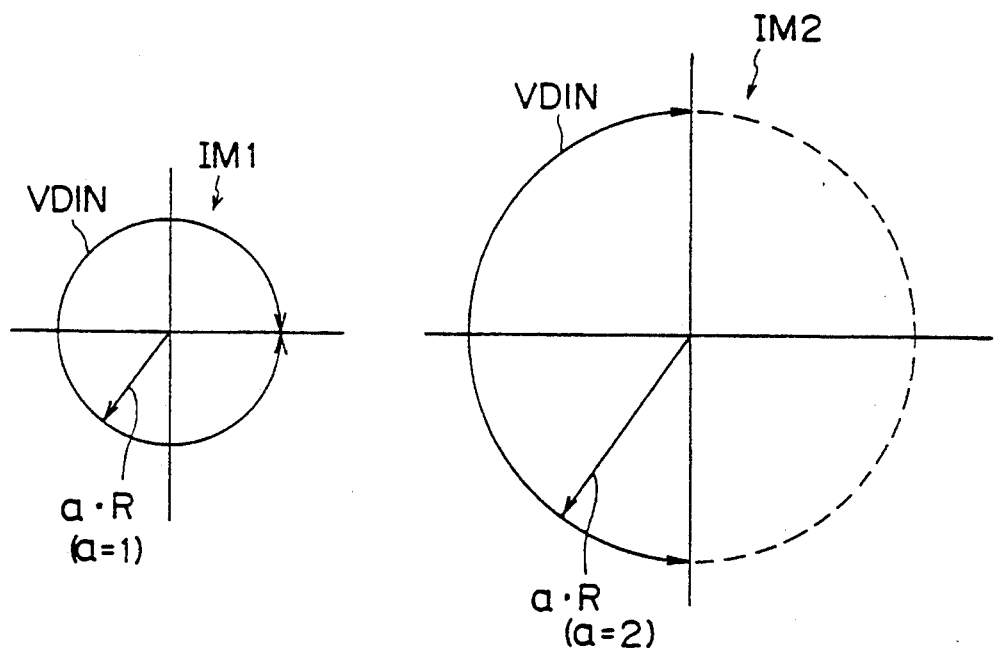
FIGS. 8A and 8B are schematic views showing a relation between a winding angle and a radius when winding an input image on a cylindrical surface.

Hence, the coefficient a of the radius a·R of the three-dimensional cylindrical surface IM obtained as the output image VDOUT2 is set to such a value a=1 that R is the radius of a three-dimensional surface IM1, wherein the input image VDIN is, as illustrated in FIG. 8B, wound through 360° on the surface IM1. At the same time, the coefficient a is set to such a value a=2 that 2R is the radius of a three-dimensional cylindrical surface IM2 larger than the three-dimensional surface IM1, wherein the input image VDIN is, as illustrated in FIG. 8B, wound through 180° on the surface IM2. Further, as illustrated in FIG. 9, if the three-dimensional cylindrical surface IM is displayed as the output image VDOUT2 while inclining it at an angle $\theta$, the width W of the blanking area can be obtained by the following formula:

$$W = f(a, \theta) \qquad (1)$$

In this embodiment, the width is obtainable by the following formula:

$$W = (768 \times a) \times \frac{18°}{360°} \times \sin\theta \qquad (2)$$

where the number of pixels is set to 768 for the use of a digital composite video signal, and the unit of W is the number of clocks in this embodiment.

Figure 10:
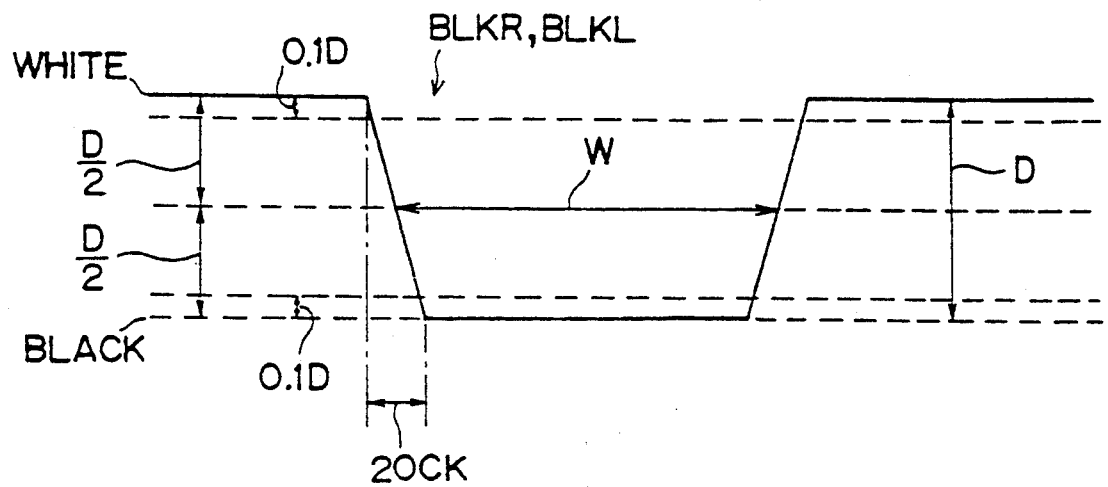
FIG. 10 is a signal waveform showing a state of forming the blanking areas.

The blanking area, as depicted in FIG. 10, changes with a slope or tilt from a white level WHITE to a black level BLACK. This slope is set so that the blanking area changes in the interval of 20 clocks from a point of changing by 10% from the white level WHITE towards the black level to a point of changing by 10% from the black level BLCK towards the white level.

Therefore, in this case, the width W of the blanking area is set based on the middle position of D between the white level WHITE and the black level BLACK.

Figure 11A:
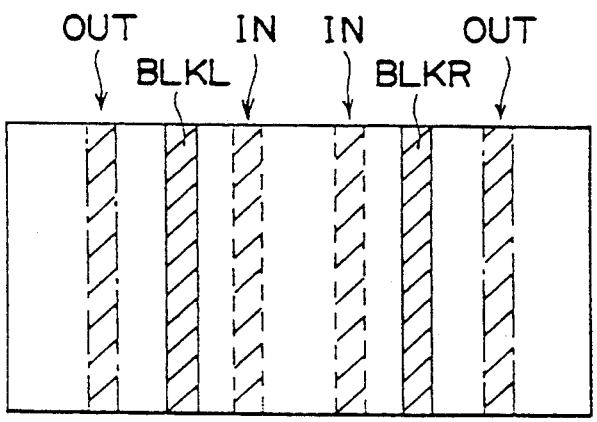
FIGS. 11A and 11B are plan views showing a relation between the size of the cylindrical surface, a display direction thereof and a set position of the blanking areas.

The blanking areas BLKR and BLKL vary in terms of their forming positions in accordance with the radius a·R of the three-dimensional surface IM obtained as the output image VDOUT2. As illustrated in FIG. 11A, if the radius a·R of the three-dimensional cylindrical surface IM increases, the blanking areas BLKR and BLKL are, as indicated by one-dotted lines, formed at outer positions indicated at OUT. Whereas if the radius a·R of the three-dimensional surface IM decreases, the blanking areas BLKR and BLKL are, as indicated by broken lines, formed at inner positions indicated at IN.

Figure 11B:
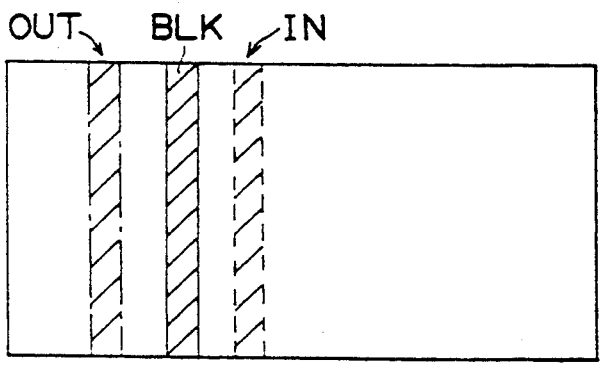

When the three-dimensional cylindrical surface IM is viewed sideways in the output image VDOUT2, the folded segments TN constitute one segment. Hence, one blanking area BLK is added to the input image VDIN, as illustrated in FIG. 11B.

In this case also, the forming position changes depending on the radius a·R of the three-dimensional surface IM. If the radius a·R of the three-dimensional cylindrical surface IM increases the blanking area BLK is, as indicated by the one-dotted line, formed in the outer left hand portion indicated at OUT. Whereas if the radius a·R of the three-dimensional cylindrical surface IM decreases, the blanking area BLK is, as indicated by the broken line, formed in the inner left-hand portion, as indicated at IN.

The input video signal SVIN changed to the black level at the address specifying a discontinuous segment is stored in an address area allocated to the address discontinuous segment (TN) of the output image in response to the write address signal in the frame memory 52.

In the case of outputting the output image VDOUT2 obtained by giving the special effect to the input image VDIN, the CPU 54 calculates a read address by performing a predetermined arithmetic operation based on transform data inputted separately by the input unit. The read address is sent as the read address signal S2 to the frame memory 52 via the read address generating circuit 55. The image data at the address specified by the read address is thereby read from each address area in the frame memory 52 in which the input video signal SVIN is stored.

As a result of this, the change-to-black-level blanking areas BLKR and BLKL stored previously therein are allocated to the address discontinuous segments (i.e., folded segments TNR and TNL) of the output image VDOUT2 on the basis of the read address.

Hence, in the address discontinuous segments, it follows that there exist the black level blanking area BLK contiguous to a first image area X1 to be actually displayed and the black level blanking areas BLKR, BLKL contiguous to a second image area X2 a part of which is folded back and concealed. When executing an interpolating process in a subsequent interpolation circuit 60, the smooth interpolation can be effected between the first image region X1 and blanking areas BLKR, BLKL and between the second image areas X2 and the blanking areas BLKR, BLKL.

Contrastingly, the black level blanking areas BLKR and BLKL are discontinuous at the folded segments TNR and TNL and therefore not readily subjected to the interpolating process. However, even if stepped notches are formed at those segments, these notches are prevented from appearing on the display image because they are all configured by the black level of the image information.

Based on the construction discussed above, the image transforming device 50 is capable of making further inconspicuous the blanking areas formed on the output image VDOUT2. This is attained by selecting the width W of the blanking areas formed beforehand on the input image VDIN according to the display tilt angle $\theta$ and the radius a·R of the three-dimensional cylindrical surface IM wound with the input image VDIN in the output image VDOUT2.

It is thus possible to further prevent the notches of the three-dimensional cylindrical surface IM obtained as the output image VDOUT2 without leading to a sense of incongruity.

With an apparatus having the foregoing construction, if the address discontinuous segments (TN) are produced on the output image VDOUT2, the black level blanking areas are previously formed in the discontinuous specifying areas of the input image VDIN to be transformed into the discontinuous segments in accordance with the display tilt angle $\theta$ and the radius a·R of the three-dimensional cylindrical surface IM. With this arrangement, it is possible to avoid the conspicuous stepped notches on the display image more effectively.

In the embodiment discussed above case where the blanking areas BLKR and BLKL are formed at angles of ±9° in the folded segments of the three-dimensional surface IM. The present invention is not, however, limited to this arrangement. Those areas may be formed at a variety of angles.

A variety of angles are applicable in the formula (2) by changing (18°/360°) to (X/360°).

The embodiment discussed above refers to the case where the D2-format-based digital composite video signal is converted. The present invention is not, however, limited to this arrangement. This invention may be applied to a case where a D1-format-based digital component video signal is converted.

In this case, the pixel number 768 in the formula (2) may be changed to 720 corresponding to the D1 format.

Stated also in the embodiment discussed above is the case where the black level blanking areas BLKR and BLKL are formed. The present invention is not, however, limited to this arrangement. The blanking areas assuming a variety of colors can be formed corresponding to the input image VDIN.

Mentioned further in the embodiment discussed above is the case where the blanking area BLK is formed with respect to the input image. The present invention is not, however, limited to this arrangement. For instance, it is feasible to effectively restrain the notches of the image keyed by a keying signal by effecting the process described above on the keying signal rather than on the input image signal.

As discussed above, the image transforming device according to the present invention is capable of preventing the conspicuous stepped notches from being produced on the display image in the discontinuous areas in the output image. This involves the step of previously forming the blanking areas in the address discontinuous areas of the input image which correspond to the address discontinuous areas in the output image.

It is feasible to attain the improved image transforming device capable of further preventing the stepped notches without a sense of incongruity by setting the width of the blanking areas in accordance with the display angle and the size of the three-dimensional surface obtained as the output image.

A, further embodiment of the present invention will hereinafter be described with reference to.

Figure 12:
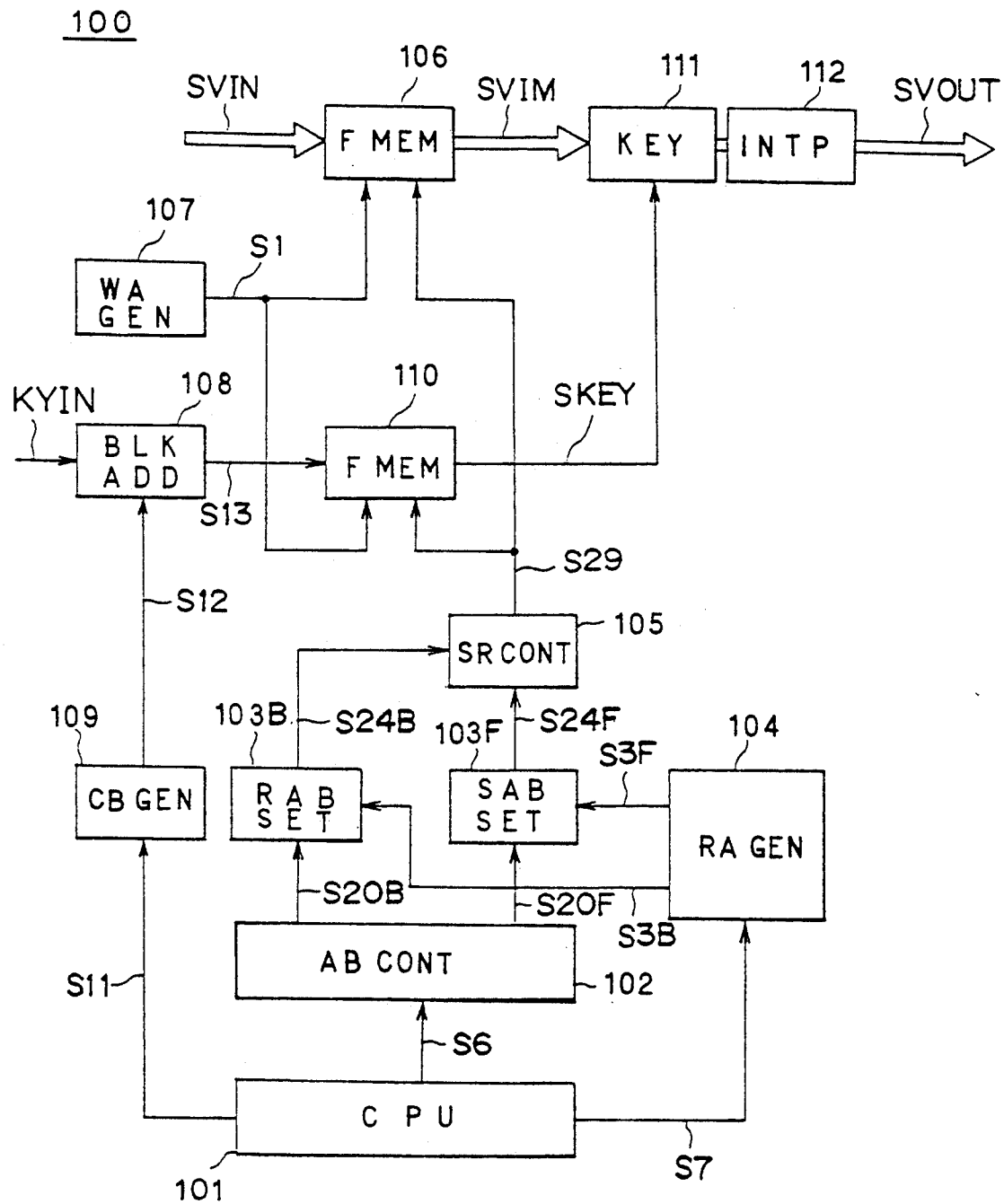
FIG. 12 is a block diagram showing a third embodiment of an image transforming apparatus of this invention.

FIG. 12 in which, an address BLK control circuit 102 of an image transforming device 100 inputs an address BLK setting signal S6 transmitted from a CPU 102. Then, the control circuit 102 selects whether the blanking area BLK specified by an address BLK setting signal S6 is an image on a front surface VDF having a high display priority of a cylindrical surface IM shown in FIG. 13 or an image on a rear face VDB having a low display priority. If blanking on the area BLK is front surface VDF, the control circuit 102 transmits, to a subsequent surface address BLK setting circuit 103F, an address BLK interlocking signal S20F for effecting control so as not to read an address of the blanking area BLK in accordance with this blanking area BLK.

Therefore, the surface address BLK setting circuit 103F generates a read surface address signal S24F capable of preventing a read of image data from the address corresponding to the blanking area BLK among read surface address signals S3F inputted from a read address generating circuit 104. This signal S24F is transmitted to a subsequent surface/rear-face control circuit 105.

On the other hand, if the blanking area BLK specified by the address BLK setting signal S6 is the image on the rear face VDB of the cylindrical surface IM, the address BLK control circuit 102 transmits, to a subsequent rear-face address BLK setting circuit 103B, an address BLK fixing signal S20B for effecting control so as to read all the addresses without depending on the blanking area BLK.

Hence, the rear-face address BLK setting circuit 103B generates a read rear-face address signal S24B capable of reading all the image data including the image data given from the address corresponding to the blanking area with respect to the read rear-face address signal S3B inputted from the read address generating circuit 104. This signal S24B is also transmitted to the subsequent surface/rear-face control circuit 105.

Based on a write address signal S1 transmitted from a write address generating circuit 107, the frame memory 106 specifies addresses within a frame memory 106 with respect to blocks obtained by dividing one-frame image data of an input image VDIN according to a predetermined size, the image VDIN being inputted in response to the input video signal SVIN. The frame memory 106 then sequentially stores the image data of respective blocks in accordance with the thus allocated addresses.

The input image VDIN stored in the frame memory 106 is read therefrom in response to a read address signal S29 transmitted from the surface/rear-surface control circuit 105. The image is thereby transformed into an output image VDOUT1 in which the respective blocks of the input image VDIN are sequentially stuck a polygonal pseudo surface on a predetermined three-dimensional surface (e.g., cylindrical surface) IM.

At this time, the CPU 101 transmits, to a clipping BLK generating circuit 109, a clipping specifying signal S11 arranged to set a black level blanking area along a white keying image KYIN consisting of a key image signal SKYIN supplied to a BLK add circuit 108. A clipping Bg BLK add signal S12 is thereby transmitted from the clipping BLK generating circuit 109 to the BLK add circuit 108. Transmitted to subsequent frame memory 110 is a clipping key image signal S13 obtained from the circuit 108 and, wherein the blanking area BLK is formed in the predetermined area of the white image (KYIN).

The frame memory 110 writes the incoming clipping key image signal S13 at a predetermined address per block on the basis of the write address signal S1 transmitted from the write address generating circuit 107.

The intra-address image data in frame memory 110 is read by the read address signal S29 transmitted from the surface/rear-face control circuit 105 and is supplied as a key signal SKEY to a keying circuit 111.

The keying circuit 111 is a circuit for executing a so-called clipping process to add the blanking area BLK to the area specified by the keying signal SKEY with respect to a three-dimensional surface image signal SVIM transmitted from the frame memory 106. Where the blanking area BLK is set in the predetermined area of the key image KYIN, the key image KYIN undergoes such processing as to be overlapped with the three-dimensional surface IM. The blanking area BLK is thereby formed on an upper part of the cylindrical surface IM.

The output signal of keying circuit 111 is applied to an interpolating circuit 112 which performs an interpolating process.

Figure 13:
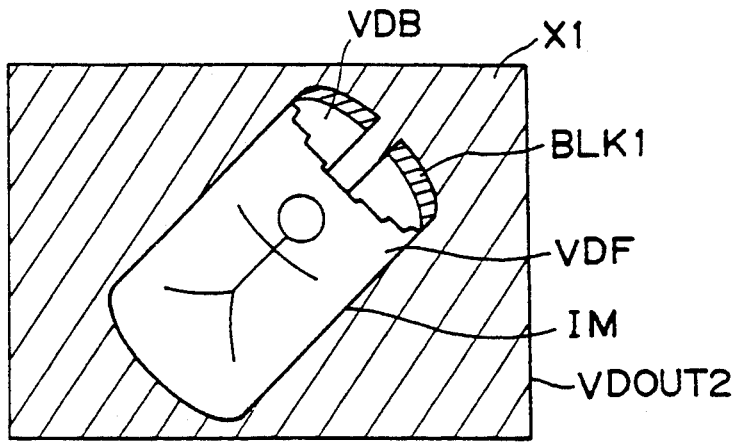
FIG. 13 and FIG. 14 are schematic views illustrating output images that may be obtained with the apparatus in accordance with the embodiment of FIG. 12.
Figure 14:
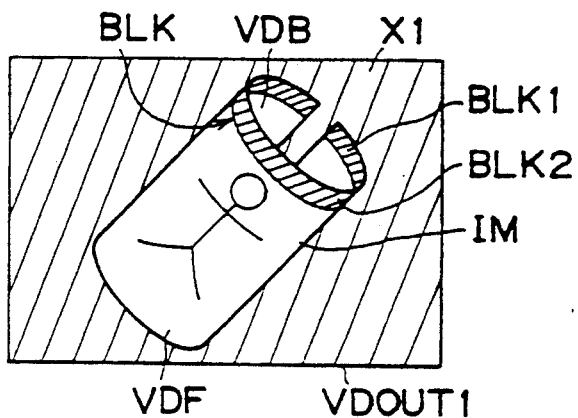

In consequence of this, on the surface VDF of the cylindrical surface IM obtained as an output image, no address data of a blanking area BLK2 shown in FIG. 14 is read. No black line is thereby produced in this portion as illustrated in FIG. 13. Read simultaneously is address data of a blanking area BLK1 on the rear face VDB of the cylindrical surface IM. As depicted in FIG. 13, the blanking area BLK1 is thereby formed in this portion. This blanking area BLK1 is configured to assume the same color as a background color X1 of the output image VDOUT2. It is possible to make the blanking area BLK1 invisible in this portion.

Based on the construction discussed above, in the image transforming process of image-transforming the input image VDIN into the cylindrical surface IM, the image transforming device 100, when reading the image data on the surface VDF or on the rear face VDB, selects whether to read the read addresses up to the blanking area BLK in accordance with whether the image data is on the front surface VDF or on the rear face VDB. An address BLK fixing mode for generating the black lines BLK1 or an address BLK interlocking mode for inhibiting the generation of black lines BLK2 is then selected.

Figure 15A:
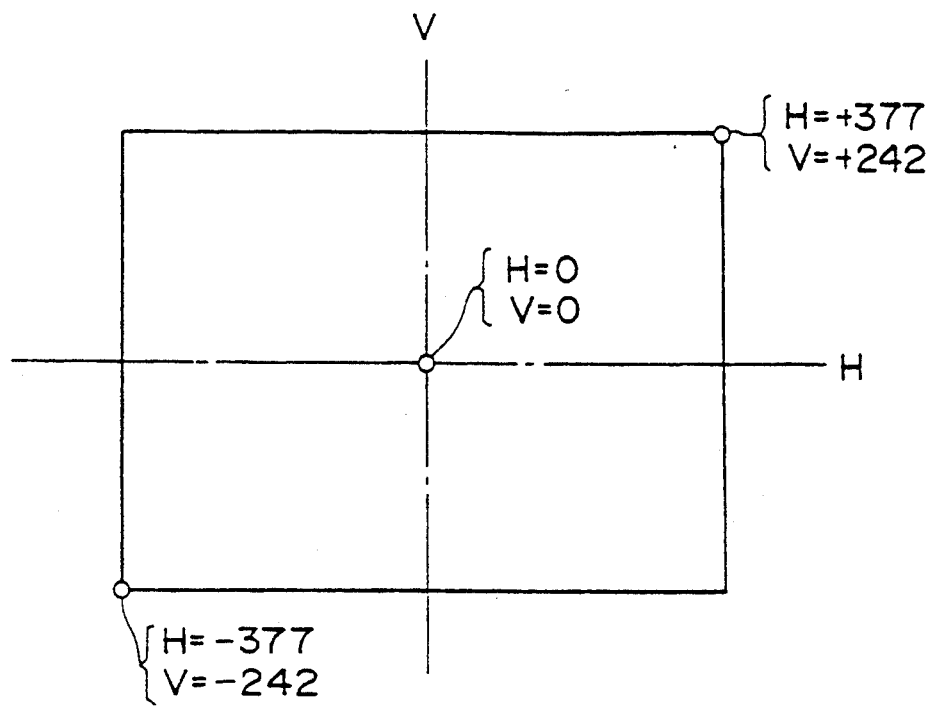
FIGS. 15A and 15B are schematic views explaining setting of a read address range interlocking with a clipping process in a memory.
Figure 15B:
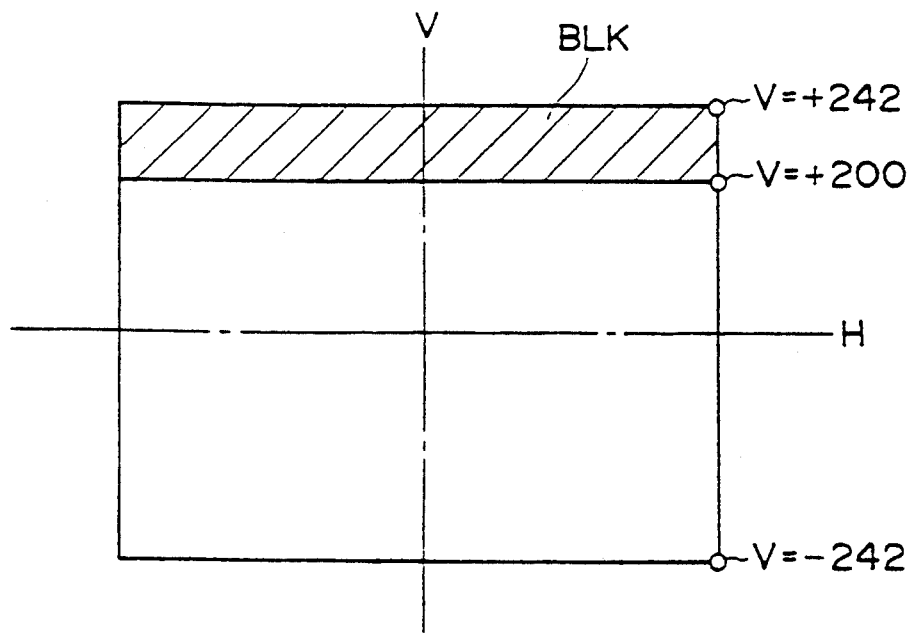

More specifically, as illustrated in FIG. 15A, the addresses allocated to the image data within, e.g., 1-frame image in the frame memory are set to −377 through +377 in the horizontal direction and −242 through +242 in the vertical direction. As illustrated in FIG. 15B, when clipping, e.g., a vertical address range V=+200 through +242, an address read range of the read addresses in the address BLK interlocking mode is set to −242 through +200. It therefore follows that an intra frame memory clipping processing range (i.e., the blanking area BLK) is not read.

Hence, it is practicable that the blanking area BLK is not displayed in the output image VDOUT2.

On the other hand, in the address BLK fixing mode, even when the blanking area BLK is formed by the clipping process, the image data are read from all the addresses. The blanking area BLK can be therefore displayed in the output image VDOUT2.

Hence, on the basis of a BLK range setting signal S6 inputted from the CPU 101, the address BLK control circuit 102 shown on FIG. 12 executes the address interlocking mode, if the image data to be read at this moment is associated with the image on the front surface VDF of the cylindrical surface IM. In the subsequent surface address setting circuit 103F, surface address signal S24F is obtained such that the clipping range is not read. On the other hand, if the BLK setting range is associated with the image on the rear face VDB of the cylindrical surface IM, the address fixing mode is executed. If that case, the subsequent rear-face address BLK setting circuit 103B provide a read rear-face address signal S24B such that the clipping range is read together with other image data.

Therefore, as depicted in FIG. 14, it is feasible to obtain the cylindrical surface IM as the output image VDOUT2 shown in FIG. 13, wherein the black lines BLK2 are not produced.

In accordance with the construction discussed above, the read priorities of the image data both on the front surface VDF and on the rear face VDB are detected depending on the modes of the image transform. The control is effected to read no clipping range (BLK) with respect to the read address range of the high display priority image (VDF). At the same time, the control causes reading inclusive of the clipping range with respect to the read address range of the low display priority image (VDB). It is thus possible to effectively avoid the conspicuous black lines BLK2 of the cylindrical surface IM acquired as the output image VDOUT2.

Incidentally, no black line BLK2 appears on the surface VDF of the cylindrical surface IM. Instead, the address becomes discontinuous, thereby causing the notches. However, it is possible, as a matter of fact, to reduce the unnaturalness of the picture as compared with a case where the black lines BLK2 are produced.

Figure 16:
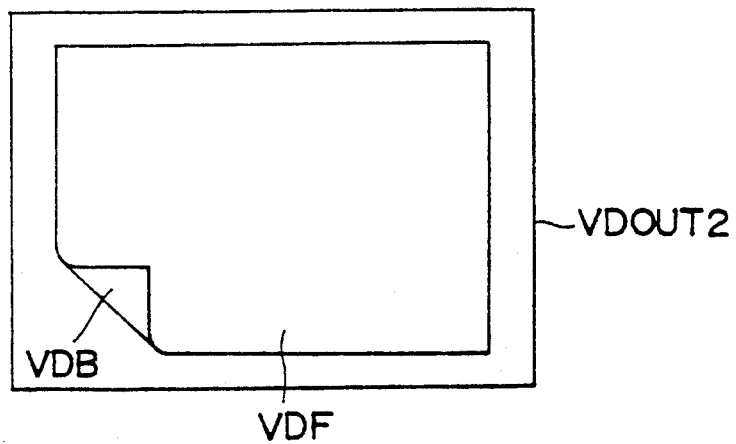
FIG. 16 is a schematic view illustrating an output image in another embodiment.

In the embodiment discussed above, the case has been described in which the image transforming process involved cylindrical winding of the input image VDIN. The present invention is not, however, limited to this arrangement. The present invention is applicable to the execution of a variety of special effects as in the case of performing a so-called page turning effect process in which the input image appears on a page which is turned, as shown in, e.g., FIG. 16.

In this case, when performing, e.g., the page turning effect process, the rear-face image VDB is prior to the front surface image VDF. The read address range of the rear-face image VDB is made to interlock with the clipping range, with the rear-face image VDB serving as a high display priority image. The control may be carried out so as not to read the clipping range with respect to the read address range of the rear-face image VDB.

Mentioned in the embodiment given above is the case where the clipping area is set in the vertical address range. The present invention is not, however, limited to this arrangement. This invention is widely applicable and may be set to a variety of ranges as in the case of setting the clipping range in the horizontal address range.

As discussed above, in accordance with the present invention, the read address range of the high display priority image interlocks with the clipping range. The image data is not read from the clipping range. At the same time, the image data is read also from the address of the clipping range with respect to the read address range of the low display priority image. It is possible to attain an image transforming device capable of minimizing the steplike amount of the notches and effectively avoiding the generation of the black lines in the output image.

What is claimed is:

1. An image transforming apparatus wherein an output image is formed by mapping an input image onto a three-dimensional curved surface, comprising:

blanking add means for inserting a blanking signal into a predetermined region of said input image;

storing means for storing said input image with said blanking signal inserted therein in response to a writing address signal applied to said storing means;

interpolating means for forming said output image signal by interpolating on the basis of a signal read out from said storing means;

arithmetic operation means for obtaining data by performing an arithmetic operation, said data being representative of a position of a region on said input image corresponding to a position on said output image at which image information becomes discontinuous; and control means for controlling said blanking add means such that the position of said predetermined region at which said blanking signal is inserted coincides with the position of said region on the basis of said data obtained from said arithmetic operation by said operation means, said control means including comparison means for comparing said data representative of the position of said region with said writing address signal applied to said storing means.

2. The image transforming apparatus according to claim 1, wherein said blanking signal is a video signal having a black level.

3. The image transforming apparatus according to claim 1, wherein said blanking signal is a video signal having a predetermined color.

4. An image transforming apparatus wherein an output image is formed by mapping an input image onto a three-dimensional curved surface, comprising:

blanking add means for inserting a blanking signal into a first region and a second region of an input image;

storing means for storing said input image with said blanking signal inserted in said first and second regions in response to first and second writing address signals, respectively, applied to said storing means;

interpolating means for forming said output image signal by interpolating on the basis of a signal being read out from said storing means;

arithmetic operation means for obtaining the first data and second data by performing an arithmetic operation, said first and second data being representative of positions of said first region and said second region of said input image corresponding to first and second positions on said output image at which image information becomes discontinuous; and control means for controlling said blanking add means such that the positions of said first and second regions at which said blanking signal is inserted coincide respectively with the positions of regions obtained on the basis of said first and second data from said arithmetic operation means, said control means including first comparison means for comparing the first data representative of the position of said first region calculated by said operation means with said first writing address signal applied to said storing means, and second comparison means for comparing the second data representative of the position of said second region calculated by said operation means with said second writing address signal applied to said storing means.

5. The image transforming apparatus according to claim 4, wherein a width of the region on said input image at which said blanking signal is inserted is controlled on the basis of the curvature of said three-dimensional curved surface at a position on said output image at which said image information becomes discontinuous.

6. An image transforming apparatus wherein an output image is formed by mapping an input image onto a three-dimensional curved surface, comprising:

blanking add means for inserting a blanking signal into a predetermined region of said input image;

interpolating means for forming an output image signal by interpolating on the basis of said input image with said blanking signal inserted therein;

arithmetic operation means for obtaining data by performing an arithmetic operation, said data being representative of a position of a region on said input image corresponding to a position on said output image at which image information becomes discontinuous;

means for distinguishing whether or not the position of the region on said input image represented by said data obtained by the operation of said arithmetic operation means corresponds to a region which has high indicative priority on said output image; and control means for controlling said blanking add means in response to said means for distinguishing, such that, when the position of the region on said input image obtained by the arithmetic operation of said arithmetic operation means corresponds to a region of said output image having high indicative priority, said blanking signal is not added to the respective region on said input image and, when the position of the region on said input image obtained by the arithmetic operation of said arithmetic operation means does not correspond to a region having high indicative priority on said output image, said blanking signal is added to the respective region on said input image.

7. The image transforming apparatus according to claim 6, wherein said blanking add means includes:

first storing means for storing said input image;

second storing means for storing said blanking signal; and keying means for synthesizing the image signal read out from said first storing means and the blanking signal read out from said second storing means.

* * * * *